United States Patent
Schroeder et al.

(10) Patent No.: US 10,438,282 B2
(45) Date of Patent: Oct. 8, 2019

(54) COMPUTERIZED INVOICE RECORD AND RECEIPT RECORD MATCHING UTILIZING BEST MATCH CRITERIA

(71) Applicant: ORACLE INTERNATIONAL CORPORATION, Redwood Shores, CA (US)

(72) Inventors: Jurgen Schroeder, Plymouth, MN (US); Gerald J. Hanson, Apple Valley, MN (US); Dmitriy Uchenik, Burnsville, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 542 days.

(21) Appl. No.: 14/879,408

(22) Filed: Oct. 9, 2015

(65) Prior Publication Data
US 2017/0103455 A1    Apr. 13, 2017

(51) Int. Cl.
*G06Q 40/02* (2012.01)

(52) U.S. Cl.
CPC .................................. *G06Q 40/02* (2013.01)

(58) Field of Classification Search
CPC ..................................................... G06Q 40/02
USPC ........................................................... 705/30
See application file for complete search history.

(56) References Cited

U.S. PATENT DOCUMENTS

| | | | |
|---|---|---|---|
| 5,189,608 A | 2/1993 | Lyons | |
| 7,130,822 B1 | 10/2006 | Their | |
| 7,437,327 B2 | 10/2008 | Lam et al. | |
| 7,539,634 B2 | 5/2009 | Goodbody | |
| 7,801,878 B2 * | 9/2010 | Hayes | G06Q 20/102 707/708 |
| 7,865,411 B2 | 1/2011 | Stone et al. | |

(Continued)

FOREIGN PATENT DOCUMENTS

EP    1364328 A2    11/2003

OTHER PUBLICATIONS

Omega, Invoice Verification, pp. 1-7; downloaded Jul. 23, 2015 from: http://www.omega.no/support/userguide-cost/ug-invoiceverification.

(Continued)

*Primary Examiner* — A. Hunter Wilder
*Assistant Examiner* — Joseph M Mutschler
(74) *Attorney, Agent, or Firm* — Kraguljac Law Group, LLC

(57) ABSTRACT

Systems, methods, and other embodiments associated with invoice record and receipt record matching utilizing best match criteria are described. In one embodiment, a method includes matching a plurality of invoice records to a plurality of receipt records based on a first set of criteria. When an invoice record matches no more than one receipt record, the invoice record is marked to indicate that the invoice record is matched to the receipt record. When an invoice record matches at least two receipt records based on the first set of criteria, one of the at least two receipt records is selected as a best match receipt record based on a second set of criteria. The invoice record is marked to indicate that the invoice record is matched to the selected receipt record. The invoice records determined to have matching receipt records are transmitted for payment by a financial system.

20 Claims, 4 Drawing Sheets

(56) References Cited

U.S. PATENT DOCUMENTS

| | | |
|---|---|---|
| 8,112,355 B1 | 2/2012 | Lam |
| 8,285,573 B1 | 10/2012 | Ballaro |
| 8,326,754 B2 | 12/2012 | Bandych |
| 8,694,429 B1 | 4/2014 | Ballaro et al. |
| 2002/0026416 A1 | 2/2002 | Provinse |
| 2002/0107794 A1 | 8/2002 | Furphy |
| 2002/0198830 A1 | 12/2002 | Randell et al. |
| 2003/0120563 A1 | 6/2003 | Meyer |
| 2003/0220858 A1 | 11/2003 | Lam |
| 2004/0059597 A1 | 3/2004 | Tkaczyk |
| 2005/0177470 A1 | 8/2005 | Tandon |
| 2005/0177507 A1* | 8/2005 | Bandych .............. G06Q 20/10 705/40 |
| 2009/0164347 A1 | 6/2009 | Sison et al. |
| 2013/0054421 A1 | 2/2013 | Bandych et al. |
| 2013/0304639 A1 | 11/2013 | Acsay et al. |
| 2013/0332210 A1 | 12/2013 | Wyganowski et al. |
| 2014/0032427 A1 | 1/2014 | Gannon |
| 2014/0337190 A1 | 11/2014 | Watanabe |
| 2015/0142646 A1 | 5/2015 | Timm et al. |
| 2015/0242966 A1 | 8/2015 | Marlowe |
| 2016/0300277 A1 | 10/2016 | Marlowe et al. |
| 2017/0103455 A1 | 4/2017 | Schroeder |

OTHER PUBLICATIONS

Dynamic Business Solutions, Resolve Invoice Matching Discrepancies, pp. 1-2; downloaded Jul. 23, 2015 from: http://dynamicbusinesssolutions.ru/axinfowk.en/html/82852252-b348-436b-92fb-f26f3982337c.htm.

Office Action dated May 18, 2017 for co-pending U.S. Appl. No. 14/955,171, filed Dec. 1, 2015.

Office Action dated Nov. 16, 2016 for co-pending U.S. Appl. No. 14/955,171, filed Dec. 1, 2015.

Notice of Allowance dated Jul. 27, 2017 for co-pending U.S. Appl. No. 14/955,171, filed Dec. 1, 2015.

Palette Software & Consulting AB, Palette Ordermatching—Match Supplier Invoices to Purchase Orders and Increase Automation, pp. 1-2; Copyright 2013; downloaded from: http://www.palette-group.com/products/palette-matcher-en/.

Microsoft, About Accounts Payable Invoice Matching [AX 2012], pp. 1-5; updated Feb. 1, 2013; downloaded from: https://technet.microsoft.com/en-us/library/hh242852.aspx.

Oracle, Oracle Retail Invoice Matching Operations Guide, Release 14.1, Chapters 4 and 5 (Functional Design, and Integration), pp. 4-1 thru 4-31 and 5-1 thru 5-28; Dec. 2014.

Oracle, Oracle Retail Merchandising—Implementation Guide, Release 14.1,Oracle Retail Invoice Matching, Chapter 8, pp. 8-1 thru 8-5; Dec. 2014.

* cited by examiner

COMPUTERIZED INVOICE RECORD AND RECEIPT RECORD MATCHING UTILIZING
BEST MATCH CRITERIA

BACKGROUND

Businesses commonly verify receipt of goods from a supplier prior to paying the supplier's invoice for the goods. This verification process typically involves matching an invoice to one or more receipt records that show that the goods were received by the business. Modern businesses have computerized invoice matching systems that match invoice records to receipt records and automatically approve an invoice for payment when a matching receipt is found.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Automated invoice matching systems allow a user to specify baseline matching criteria that define a tolerance level on matching for costs and quantities in invoices and receipt records. The matching system determines whether the cost and quantities in an invoice record and a receipt record are an exact match, a match within the tolerance level, or a potential match that is outside the tolerance level. An invoice record having a receipt record that is an exact match or a match within the tolerance level is automatically, without human intervention, deemed matched to the receipt record and transmitted to a financial system for payment. Potential matches outside the tolerance level must be sent for manual resolution, requiring human intervention which is time consuming and expensive.

In some instances more than one receipt record meets the baseline matching criteria with respect to a given invoice record. When this happens, in the interest of preserving the accuracy of the automatic matching process, typical automated invoice matching systems send the invoice record for manual resolution so that a user may select which receipt, if any, should be matched to the invoice record. Manual matching is performed because usually a vendor has invoiced for a specific shipment or receipt, and finding which match is correct or most appropriate involves looking at additional factors to prioritize and find the best match. When a human user must consider the additional criteria to find the best match, delay and cost are incurred by the automatic matching process.

Systems and methods are described herein that provide a "best matching" process that will automatically look at additional criteria to select a "best match" receipt record from amongst multiple receipt records that meet baseline matching criteria with respect to a given invoice record. In one embodiment, the systems and methods described herein consider several additional criteria in a prioritized manner. For the purposes of this description, a single invoice and a single receipt will be matched. Of course, the techniques described herein are equally applicable when invoices and/or receipt records are capable of aggregation by purchase order and considered in aggregate for matching purposes such that a single invoice may have multiple matching receipt records and vice versa. Further, the techniques described herein can be applied to matching receipt records or credit note requests to credit notes or invoices.

Figure 1:
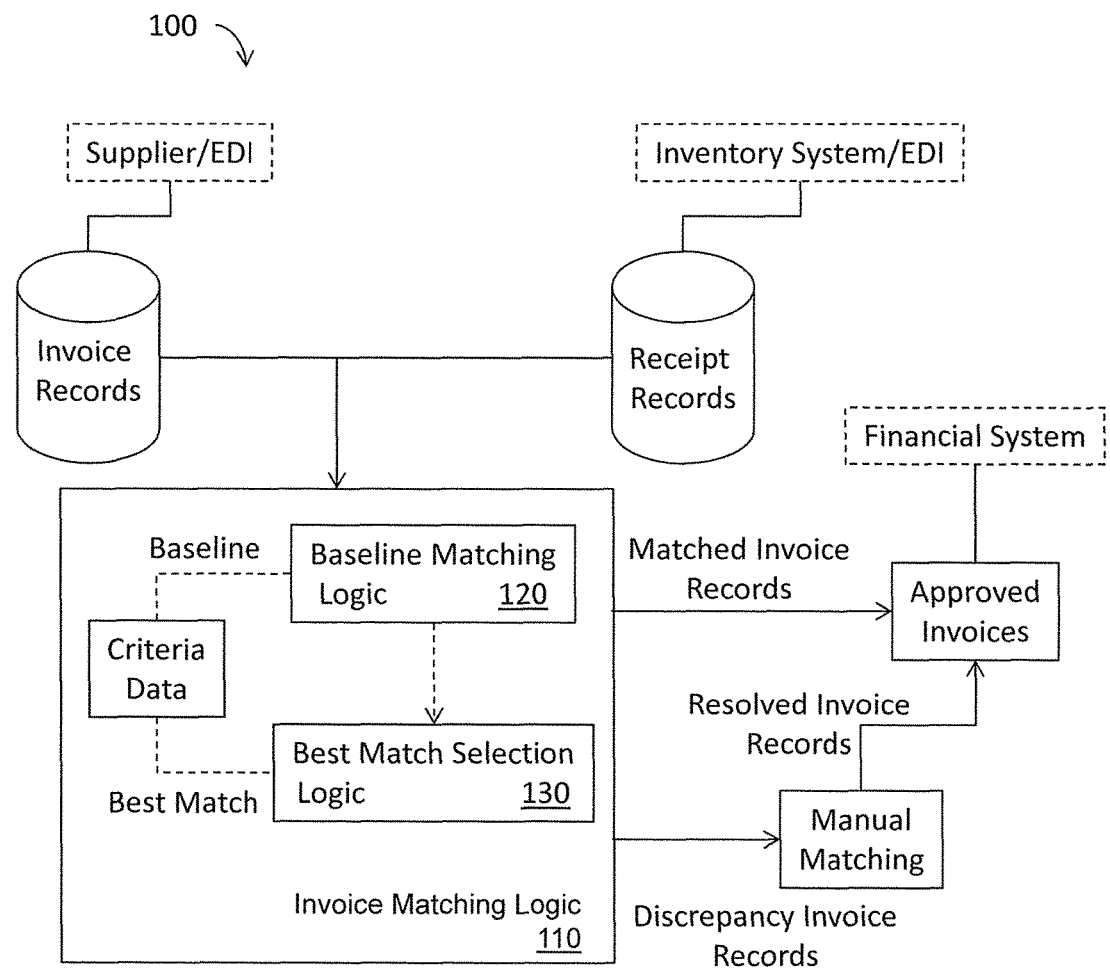
FIG. 1 illustrates one example embodiment of a system associated with invoice record and receipt record matching utilizing best match criteria.

With reference to FIG. 1, one embodiment of a computerized invoice matching system 100 that performs invoice record and receipt record matching utilizing best match criteria is illustrated. The system 100 includes invoice matching logic 110 that controls a processor (not shown, see FIG. 4) to perform various functions described herein. The invoice matching logic 110 inputs invoice records and receipt records and matches the invoice records to the receipt records based on some predetermined criteria. Invoice records and receipt records are electronic data structures that store data describing an invoice or receipt transaction. The invoice matching logic 110 outputs i) invoice records that are marked as matched and ii) invoice records that are marked as having a discrepancy.

In one embodiment, the invoice matching logic 110 retrieves the inventory records from an inventory database (e.g., by querying the inventory database). The inventory database may have been populated with invoices received from a supplier or suppliers by way of electronic data interchange (EDI) in a predetermined format configured to correspond to the invoice records stored in the invoice database.

In one embodiment, the invoice matching logic 110 retrieves the receipt records from a receipt database (e.g., by querying the receipt database). The receipt database is populated with the receipt records by the warehouses or stores. In one embodiment, the receipt database is populated by extracting receipt related data used in matching from tables maintained by an inventory system that tracks goods as they are received, stocked, and sold to create the receipt records that are stored in the receipt database. A record for a purchase order (PO) referenced by a receipt may be referenced to determine contracted per unit costs for items, and the per unit cost is recorded in the receipt record. In other embodiments the invoice database and/or the receipt database are populated by way of users entering values from paper documents as records.

In one embodiment, the invoice matching logic 110 outputs a matched invoice record by recording, in a data field in the invoice record, data that indicates that the invoice has been matched to a receipt. The marked invoice record is stored in a staging table of matched invoices that is accessed by a financial system to identify invoices to be paid. The marked invoice record may also be stored in other databases, including the invoice database, for other purposes. The invoice matching logic 110 outputs a discrepancy invoice record by recording, in a data field in the invoice record, a discrepancy code that describes the type of discrepancy and storing the marked invoice record in a database accessed by users performing manual matching on invoice records and receipt records. Once the discrepancy invoice record has been matched by hand, the invoice record is marked as matching a receipt and transmitted to memory accessible to the financial system for storage with the other matched invoice records for payment by the financial system. In due course, the financial system accesses the memory that stores matched invoices and pays the invoices.

In one embodiment, the invoice matching logic 110 is configured to perform matching as a batch process and/or a background process that takes place outside the normal or day to day operations of the supplier invoicing system, the inventory system, and the financial system that pays matched invoices. For example, the matching may be performed as a batch process overnight or during some other period of time during which the invoicing system, the inventory system, and the financial system are not performing their normal operations. Background/batch operation is facilitated because the invoice matching logic 110 draws the invoice records and receipt records from databases that are populated automatically by other systems as they are received. In this manner, the invoice matching logic 110 does not affect the operation of the other systems and merely marks invoice records and receipt records as matched in the databases after matching. Likewise, by populating a staging table with the matched invoice records for access by the financial system that pays invoices, the invoices may be paid in due course by the financial system without direct interaction with the invoice matching logic 110.

In one embodiment, the invoice matching system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the invoice matching logic 110 is a centralized server-side application that provides at least the functions disclosed herein, accesses invoice records and receipt records from many different databases via a network connection, and is accessed by many users via computing devices/terminals communicating with the computing system 100 (functioning as the server) over a computer network.

The invoice matching logic 110 includes baseline matching logic 120, best match selection logic 130, and criteria data. The criteria data describes baseline criteria to be used by the baseline matching logic 120 to match invoice records and receipt records. The criteria data also describes the best match criteria to be used by the best match selection logic 130 to select a best match receipt record from among multiple receipt records that match an invoice record according to the baseline criteria.

When the invoice matching logic 110 is triggered (e.g., as a batch process), the baseline matching logic 120 accesses the invoice records and the receipt records. In one embodiment, all invoice records and all receipt records having the same i) vendor, ii) purchase order (PO) number, and iii) billing location are retrieved for matching by the invoice matching logic 110. One example embodiment of baseline matching will now be described.

First, summary group matching is performed. In summary group matching, the total cost of all the invoice records is compared to the total cost of all the receipt records. The total cost of a receipt record may be calculated by the baseline matching logic 120 as the per-unit cost of each item taken from the PO for the receipt multiplied by the quantity of items received. The baseline criteria may also require that the total quantities of the invoice records and the total quantities of the receipt records also match. If the sum of the total costs (and optionally the sum of the total quantities) of the invoice records identically matches the sum of the total costs of the receipt records, then all of the invoice records and all of the receipt records are marked as matched and baseline matching ends.

If the sum of the total costs (and optionally the sum of the total quantities) of the invoice records does not identically match the sum of the total costs of the receipt records, then the baseline matching logic 120 determines if the sum of the total costs (and optionally the sum of the total quantities) matches within a tolerance level specified in the baseline criteria. If the sum of the total costs (and optionally the sum of the total quantities) of the invoice records matches the sum of the total costs of the receipt records within the tolerance level, then all of the invoice records and all of the receipt records are marked as matched and baseline matching ends.

If the sum of the total costs (and optionally the sum of the total quantities) of the invoice records does not match the sum of the total costs of the receipt records within the tolerance level, the invoice records and receipt records are processed further by the baseline matching logic 110 using one-to-one invoice matching. One-to-one invoice matching attempts to match each invoice record with a single receipt record as described next. First the baseline matching logic 110 attempts a match between the total cost (and optionally total quantity) of one invoice record and one receipt record. If there is an exact match or a match within the tolerance level, the invoice record and receipt record are marked as matched.

If more than one receipt record is found to match the same invoice record, the invoice record is marked as unresolved and the matching receipt records are provided to the best match selection logic 130, which attempts to select a best matching receipt record as will be described below. In one embodiment, if more than one invoice record is found to match the same receipt record, the receipt record and the matching invoice records are provided to the best match logic 130. If, after one-to-one matching on all invoice records, no invoice records remain unmatched, baseline matching ends. In one embodiment, baseline matching and the best matching process described below operate independently of one another so that the two matching processes may not be performed in the same sequence or at all in some circumstances.

If more than one invoice record remains unresolved, all remaining invoice records and receipt records are considered to be multi-unresolved, are marked with discrepancy codes, and sent for manual resolution. However, if after one-to-one matching a single invoice records remains unresolved, line level matching is performed by the baseline matching logic 120 on the remaining invoice record and any remaining receipt records.

In line level matching, the baseline matching logic 120 attempts to match each line item in the invoice record to receipt record line items for the same item. If all the lines in the invoice are successfully matched to a line item in the receipt records, the invoice record and all of the receipt records that have been matched are marked as matched. For line level matching, both cost and quantity matching are performed. If cost matching fails, quantity matching is still performed in order to route potential quantity discrepancies to the proper user for resolution. Quantity line level matching is made by comparing the quantity in the invoice record and the sum of the quantities received across the receipt records for that item. If a quantity match cannot be obtained, then the invoice record is marked as having a quantity discrepancy in the lines for the item.

Recall that during one-to-one matching (i.e., matching a single invoice to a single receipt), if multiple receipt records match the same invoice record the multiple receipt records and the invoice record are provided to the best match selection logic 130 so that the best matching receipt record, if any, can be selected and matched to the invoice record. This feature is an improvement over other matching systems that would generate a discrepancy for the invoice record that has multiple potential matching receipt records without considering any additional criteria to "break the tie."

In one embodiment, the baseline matching logic 120 provides the invoice record and multiple matching receipt records to the best match selection logic 130 by storing the records in a predetermined memory location. The baseline matching logic 120 may mark the records as requiring best match selection in a status field of the records and the best match selection logic 130 may query a database table for records having data corresponding to the mark in the status field. If a best match receipt records is selected, the best match selection logic 130 marks the matching receipt record and invoice record as matched and stores the invoice record in the staging table of matched invoices to be processed by the financial system. If a best match record cannot be selected, the best match selection logic 130 leaves the records as designated unmatched and returns the records to the baseline matching logic 120 for further processing.

The best match selection logic 130 considers one or more additional "best match criteria" to attempt to select one of the matching invoices. Examples of best match criteria will be described with reference to FIG. 2, which illustrates operation of the best match selection logic 130. In one embodiment, the best match selection feature provided by the best match selection logic 130 is optional and is enabled by the user. The best match selection logic 130 receives an invoice record IN2 that matches three different receipt records RE1, RE2, RE3 based on baseline criteria used by the baseline matching logic 120. In the example shown in FIG. 2, the baseline criteria are cost within +/−10% and quantity within +/−15%. Of course any tolerance level may be set by the user, and in most cases the threshold level will be much less than those used in FIG. 2 (e.g., usually a few percent).

It can be seen that IN1 has a total cost of 2000 and a quantity of 700. All three receipt records have total costs within 10% of 2000 (1980, 2020, and 2020, respectively) and total quantities within 15% of 700 (690, 705, and 710, respectively). Thus, all three receipt records would have been deemed as matching the invoice record by the baseline matching logic 120. As will be described now, in one embodiment, the best match selection logic 130 considers multiple criteria in a prioritized order to select the best match. In other embodiments a single one or combination of the following best match criteria may be considered in any order or other criteria may be used instead of or in addition to the best match criteria described below.

The first best match criteria selects the receipt record with the lowest overall cost variance with respect to the invoice record. The total cost variance with respect to each receipt record is computed and, in the example, all three receipt records have a 10% variance: RE1 is −10% while R2 and RE3 are +10%. Thus, none of the receipt records meet the first best match criteria. The best match selection logic 130 uses the second best match criteria to attempt to select a best match receipt record.

The second best match criteria selects the receipt record with a cost variance that results in an "underbill" meaning that the supplier billed less than was required by the PO (i.e., the invoice record cost is less than the receipt record cost). RE2 and RE3 both have cost 1980 which is less than the invoice cost of 2000. Thus, no single receipt record can be selected using the second best match criteria. The best match selection logic 130 uses the third best match criteria to attempt to select a best match receipt record.

The third best match criteria, line level cost variances are considered and the receipt record with the fewest number of line level cost variances is selected. All three of the receipt records have a single line with a cost variance with respect to IN2. For example, RE1 Line 1 has a cost of 1200 which matches Line 1 of IN2 but Line 2 has a cost of 780 which is a variance with respect to Line 2 of IN2. RE2 and RE3 each also have a single line at variance with IN2. Thus, the third best match criteria is not met and the best match selection logic 130 uses the fourth best match criteria to attempt to select a best match receipt record.

The fourth best match criteria selects the single receipt record with the lowest quantity variance. The best match logic 130 computes the quantity variance for each receipt record with respect to IN2. This best match criteria is met because a single receipt record, RE2, has a quantity variance (5 items) that is less than the quantity variance (10 items in both RE1 and RE2). The best match logic 130 selects RE2 as the best match receipt record, marks IN2 as matching RE2, and marks RE2 as matching IN2. IN2 is sent to the staging table of matched invoices. Note that manual resolution of the multiple matching receipt records was not necessary due to the best match selection logic 130 selecting RE2 as the best match receipt for IN2. This save time and cost in the invoice matching process performed by the system 100.

RE1 and RE3 are returned to the pool of receipt records being processed by the baseline matching logic 120. If no receipt record could be selected as a best match for IN2, IN2, RE1, RE2, and RE3 are marked as having a multiple-unresolved discrepancy and sent for manual resolution.

Figure 3:
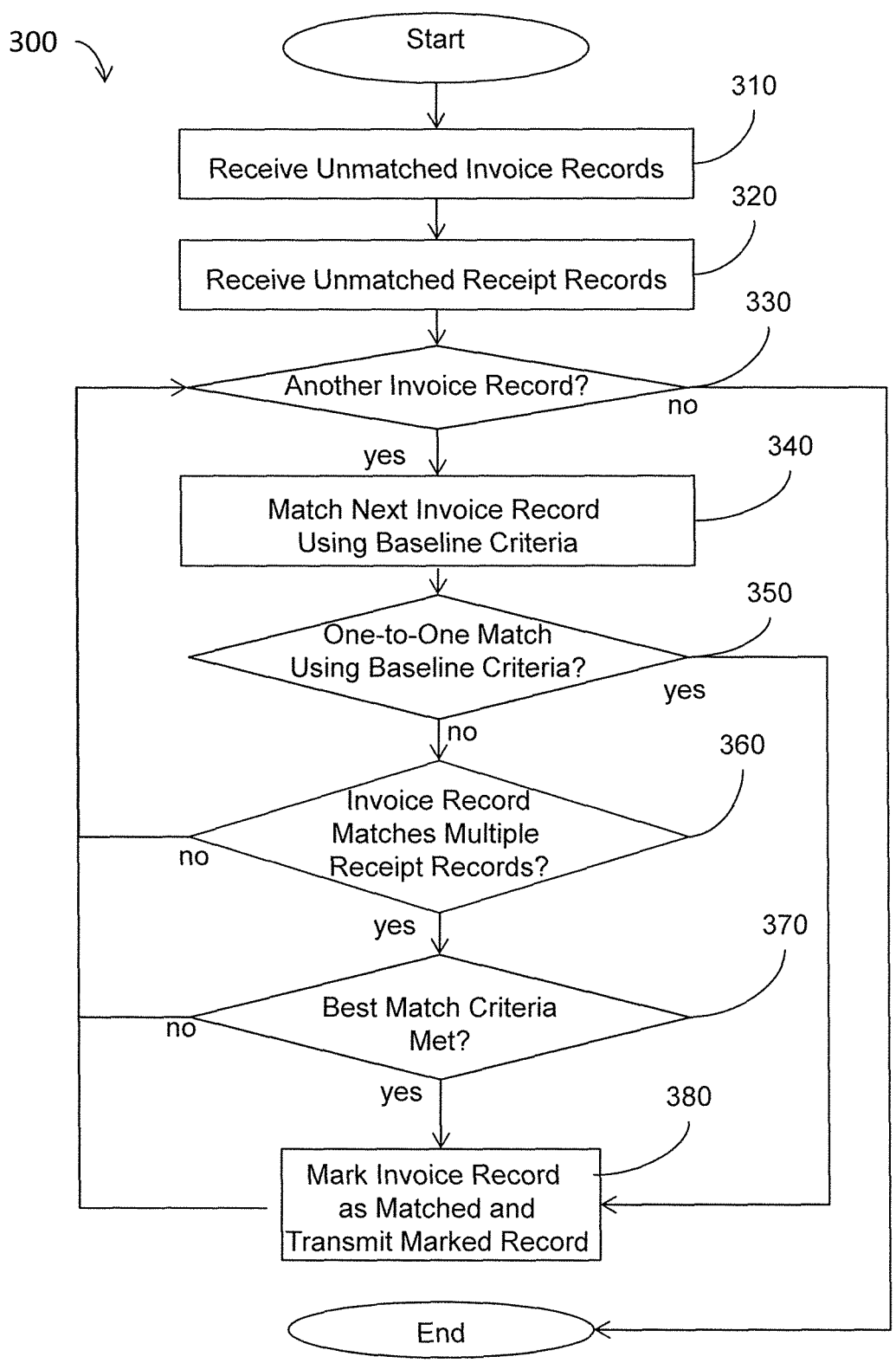
FIG. 3 illustrates one embodiment of a method associated with invoice record and receipt record matching utilizing best match criteria.

FIG. 3 illustrates one embodiment of a method 300 associated with invoice record and receipt record matching utilizing best match criteria. The method 300 may be performed periodically as a batch process or in response to some external event, such as population of the invoice database of FIG. 1 with a new invoice record. The method 300 may be invoked manually by a user to perform invoice matching. At 310, a plurality of invoice records is received. Each invoice record stores data describing an invoice quantity of items and an invoice cost. This step may be performed by the invoice matching logic 110 of FIG. 1. In one embodiment, the invoice records are stored in a database table (e.g., the invoice database of FIG. 1) that can be queried by the invoice matching logic 110 of FIG. 1. In one embodiment, the invoice records are stored in registers or memory addresses, the contents of which may be read, input, or transferred into the working memory of the invoice matching logic 110.

At 320, a plurality of receipt records is received. Each receipt record stores data describing a receipt quantity of items and a receipt cost. This step may be performed by the invoice matching logic 110 of FIG. 1. In one embodiment, the receipt records are stored in a database table (e.g., the receipt database of FIG. 1) that can be queried by the invoice matching logic 110 of FIG. 1. In one embodiment, the receipt records are stored in registers or memory addresses, the contents of which may be read, input, or transferred into the working memory of the invoice matching logic 110.

At 330, a determination is made as to whether another unmatched invoice is available for matching. If not, the method ends. As long as another invoice record remains for matching, at 340 the next invoice record is matched to the receipt records based on a first set of criteria (e.g., baseline criteria). A given invoice record is deemed to match a given receipt record when the first set of criteria are met. This step may be performed by the baseline matching logic 120 of FIGS. 1 and 2 as described with reference to "one-to-one" matching. A processor is controlled by the baseline logic 120 to compute variances between costs and quantities in invoice records and receipt records (see FIG. 4).

At 350, when an invoice record matches no more than one receipt record, the method proceeds to 380 and the invoice record is marked by recording data in the record that indicates that the invoice record is matched to the receipt record. The marking may be performed by recording data in a status field of the invoice record that indicates that the invoice record has been matched to a receipt and/or is approved for payment. The marked record is transmitted for payment by a financial system. In one embodiment, the invoice record is transmitted by storing the marked invoice record as a new record in a staging table accessed by the financial system to locate invoices to be paid. Steps 350 and 380 may be performed by the baseline matching logic 120 of FIGS. 1 and 2. The baseline matching logic 120 may perform query operations on a database table storing the invoice record to mark the record as matched. The method then returns to 330 and the next invoice record, if any, is matched.

If a one-to-one match is not found at 350, the method proceeds to 360 where a determination is made as to whether the invoice record matches at least two receipt records based on the first set of criteria. In one embodiment this step may be performed by the baseline matching logic 120 determining that a plurality of receipt records that meet the baseline criteria with respect to the invoice record. If there are no receipt records that match the invoice record at 360 the method returns to 330 and the next invoice record, if any, is matched. In one embodiment, the unmatched invoice record is marked by the invoice matching logic 110 as having a discrepancy and sent for manual resolution as shown in FIG. 1.

If at least two receipt records match the invoice record using the baseline criteria, at 370 one of the at least two receipt records is selected as a best match receipt record for the invoice when at least one of a second set of matching criteria (i.e., best match criteria) are met as between the invoice record and a single one of the at least two receipt records. This step may be performed by the best match selection logic 130 of FIGS. 1 and 2 in a manner described with reference to FIG. 2. A processor is controlled by the best match selection logic 130 to calculate cost and quantity variances and identify line item cost variances (see FIG. 4). The best match criteria are different than the baseline criteria.

If no receipt record is selected as a best match using the best match criteria at 370 the method returns to 330 and the next invoice record, if any, is matched. In one embodiment, the unmatched invoice record is marked by the invoice matching logic 110 as having a discrepancy and sent for manual resolution as shown in FIG. 1. At 370, if a best match receipt is selected, the method proceeds to 380 and the invoice record is marked by recording data in the invoice record that indicates that the invoice record is matched to the receipt record. The marking may be performed by recording data in a status field of the invoice record that indicates that the invoice record has been matched to a receipt and/or is approved for payment. The marked record is transmitted for payment by a financial system.

In one embodiment, the invoice record is transmitted by storing the marked invoice record as a new record in a staging table accessed by the financial system to locate invoices to be paid. Steps 370 and 380 may be performed by the best match selection logic 130 of FIGS. 1 and 2. The best match selection logic 130 may control a processor to perform query operations on a database table storing the invoice record to mark the record as matched. The method then returns to 330 and the next invoice record, if any, is matched. When no further invoices remain to be matched, the method ends.

In one embodiment, the method 300 includes selecting, at 370, a single one of the at least two receipt records having a receipt cost that is closest to the invoice cost as the best match receipt record for the invoice record. This step may be performed by the best match selection logic 130 of FIGS. 1 and 2 controlling a processor to compute variance in the total cost of the invoice record and the receipt records (see FIG. 4).

In one embodiment, the method includes selecting, at 370, a single one of the at least two receipt records having a receipt cost that is more than the invoice cost as the best match receipt record for the invoice record. This step may be performed by the best match selection logic 130 of FIGS. 1 and 2 controlling a processor to compute variance in the total cost of the invoice record and the receipt records (see FIG. 4).

In one embodiment, the method includes selecting, at 370, a single one of the at least two receipt records having a fewest number of item level variances with respect to the invoice record as the best match receipt record for the invoice record. This step may be performed by the best match selection logic 130 of FIGS. 1 and 2 controller a processor to identify line item variances in the invoice record and the receipt records (see FIG. 4).

In one embodiment, the method includes selecting, at 370, a single one of the at least two receipt records having a receipt quantity that is closest to the invoice quantity as the best match receipt record for the invoice record. This step may be performed by the best match selection logic 130 of FIGS. 1 and 2 controlling a processor to compute variance in the total quantity of the invoice record and the receipt records (see FIG. 4).

It can be seen from the foregoing description that the systems and methods herein automatically consider additional criteria to select a best match receipt record from amongst multiple matching receipt records that meet baseline matching criteria. This saves time and expense by, in many cases, automatically performing the selection without requiring manual resolution by a human operator.

Computing Device Embodiment

Figure 4:
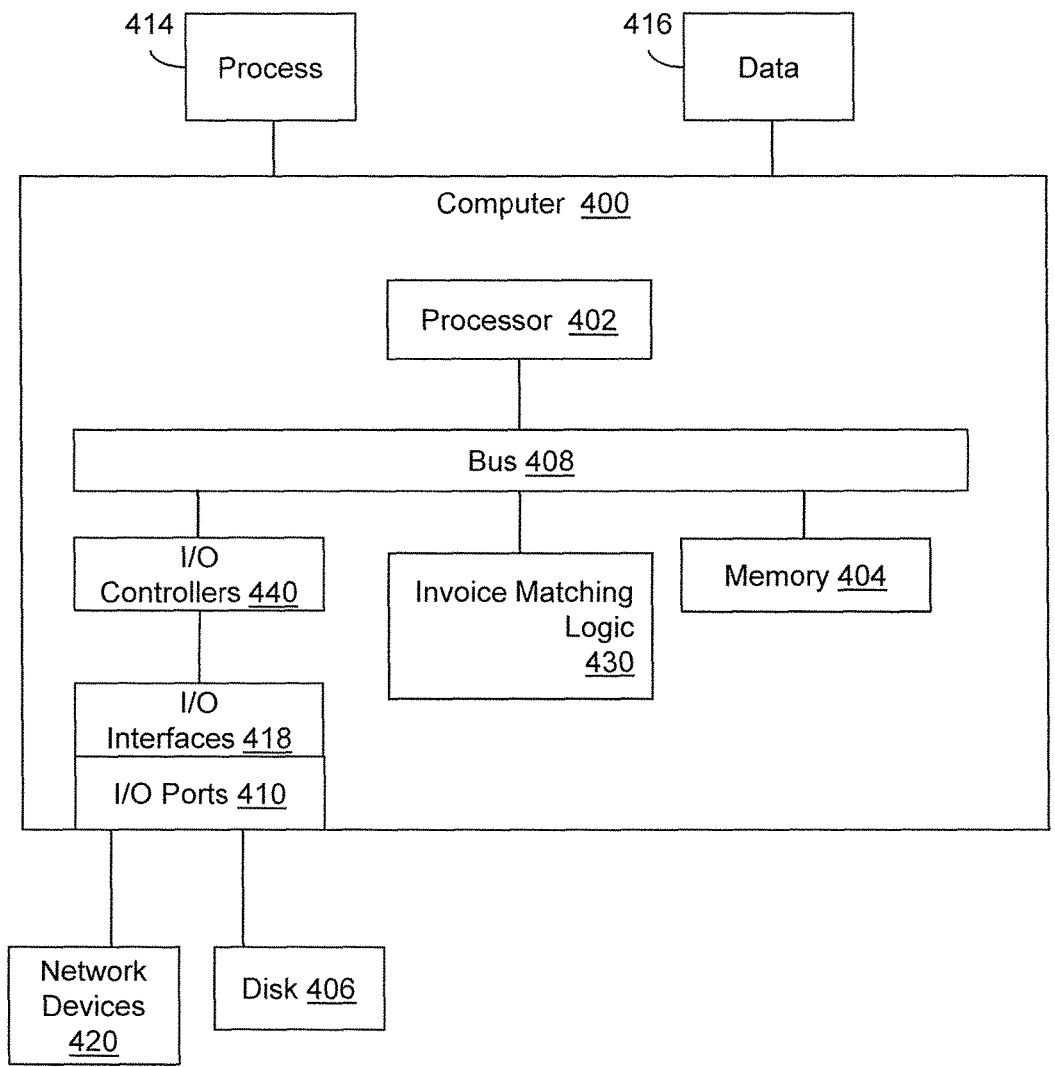
FIG. 4 illustrates an embodiment of a computing system configured with the example systems and/or methods disclosed.

FIG. 4 illustrates an example computing device that is configured and/or programmed with one or more of the example systems and methods described herein, and/or equivalents. The example computing device may be a computer 400 that includes a processor 402, a memory 404, and input/output ports 410 operably connected by a bus 408. In one example, the computer 400 may include invoice matching logic 430 configured to perform invoice record and receipt record matching utilizing best match criteria in a manner similar to the invoice matching logic 110 shown in FIG. 1 and further explained in FIG. 2. In different examples, the invoice matching logic 430 may be implemented in hardware, a non-transitory computer-readable medium with stored instructions, firmware, and/or combinations thereof. While the invoice matching logic 430 is illustrated as a hardware component attached to the bus 408, it is to be appreciated that in other embodiments, the invoice matching logic 430 could be implemented in the processor 402, stored in memory 404, or stored in disk 406.

Figure 2:
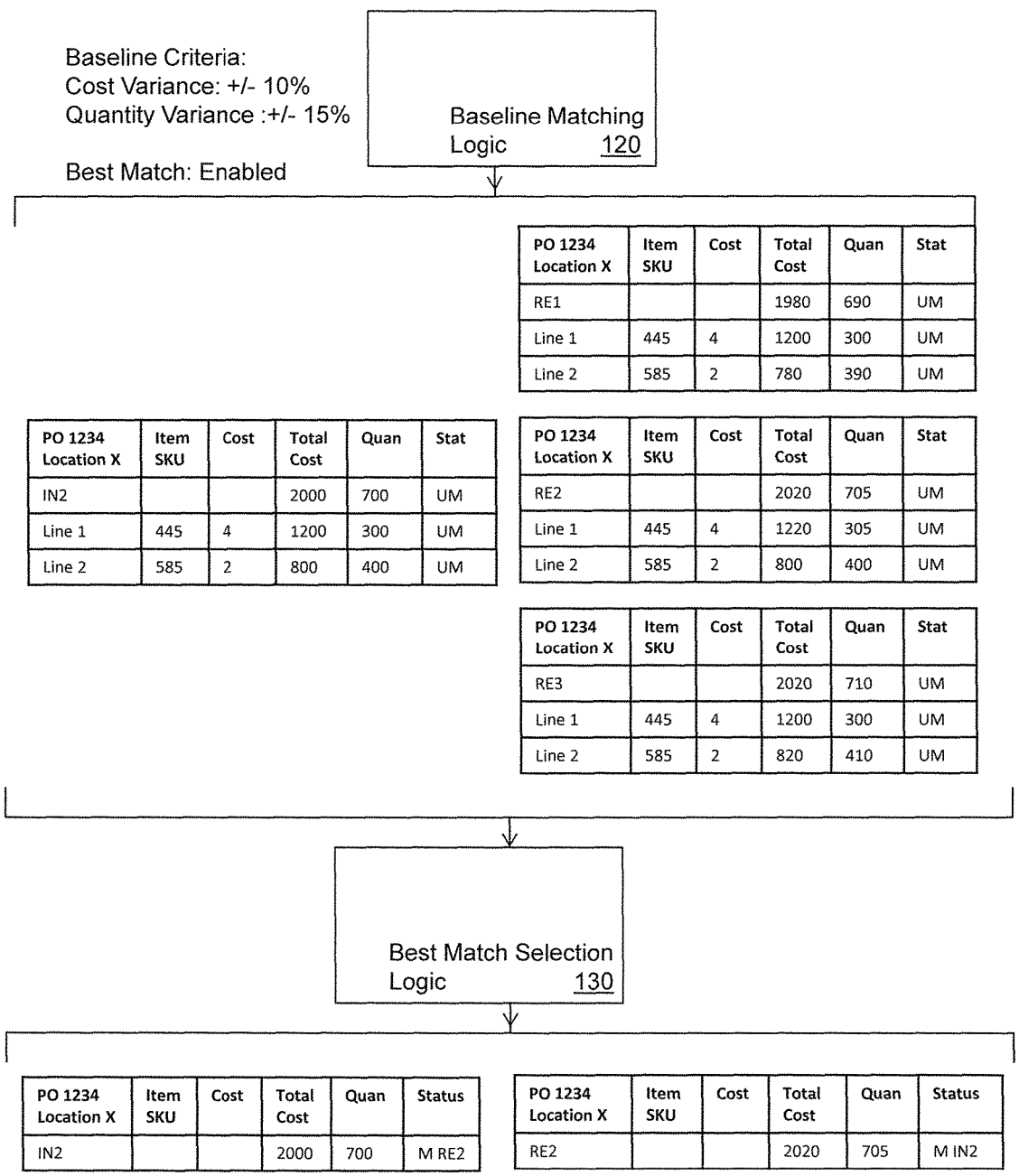
FIG. 2 illustrates an example of the system of FIG. 1 selecting a best matching receipt record for a given invoice record.

In one embodiment, invoice matching logic 430 or the computer is a means (e.g., structure: hardware, non-transitory computer-readable medium, firmware) for performing the actions described in FIGS. 1-3. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform the method 300 of FIG. 3, as further explained in FIGS. 1 and 2. The means may also be implemented as stored computer executable instructions that are presented to computer 400 as data 416 that are temporarily stored in memory 404 and then executed by a processor 402.

Invoice matching logic 430 may also provide means (e.g., hardware, non-transitory computer-readable medium that stores executable instructions, firmware) for performing the method 300 of FIG. 3, as further explained in FIGS. 1 and 2.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a compact disk-read only memory (CD-ROM) drive, a CD recordable (CD-R) drive, a CD read/write (CD-RW) drive, a digital video disc (DVD) ROM, and so on. The memory 404 can store a process 414 and/or a data 416, for example. The disk 406 and/or the memory 404 can store an operating system that controls and allocates resources of the computer 400.

The computer 400 may interact with input/output devices via the i/o interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and universal serial bus (USB) ports.

The computer 400 can operate in a network environment and thus may be connected to the network devices 420 via the I/O interfaces 418, and/or the i/o ports 410. Through the network devices 420, the computer 400 may interact with a network. Through the network, the computer 400 may be logically connected to remote computers. Networks with which the computer 400 may interact include, but are not limited to, a local area network (LAN), a wide area network (WAN), and other networks.

For simplicity sake, throughout the description reference is made to criteria, values, and records. It is to be understood that these terms refer to data or data structures that encode the criteria, values, and records in a manner that is interpretable by a computing device. Likewise, the terms supplier, warehouse, inventory system, financial system, retailer refer to computer systems and components that perform the described functions on the data structures encoding the criteria, values, and records.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a computing device cause the computing device to:
   receive a plurality of invoice records from an inventory database, where each invoice record stores data describing an invoice quantity of items and an invoice cost;
   receive a plurality of receipt records from a receipt database, where each receipt record includes data describing a receipt quantity of items and a receipt cost;
   match the plurality of invoice records to the plurality of receipt records such that a given invoice record is deemed to match a given receipt record when a first set of criteria are met;
   for each invoice record that matches a single receipt record and no other receipt record, record data in the invoice record indicating that the invoice record is matched to the receipt record;
   for each invoice record that matches at least two receipt records based on the first set of criteria, the computing device is caused to:
   (i) use a second set of criteria to select one of the at least two receipt records as a best match receipt record for the invoice when at least one of the second set of criteria are met as between the invoice record and a single one of the at least two receipt records, wherein the second set of criteria is evaluated using a different technique from the first set of criteria and the different technique is subsequent in order of priority to a technique used to evaluate the first set of criteria; and (ii) record data in the invoice record indicating that the invoice record is matched to the selected receipt record;

where the first set of criteria is different from the second set of criteria;

transmit, via a network communication to a remote system, the invoice records determined to have matching receipt records; and transmit, via the network communication to the remote system, a command to initiate payment of the invoice records by the remote system.

2. The non-transitory computer-readable medium of claim 1, wherein the instructions to selectively utilize criteria comprise instructions configured to cause the computing device to select a single one of the at least two receipt records having a receipt cost that is closest to the invoice cost as the best match receipt record for the invoice record.

3. The non-transitory computer-readable medium of claim 1, wherein the instructions to selectively utilize criteria comprise instructions configured to cause the computing device to select a single one of the at least two receipt records having a receipt cost that is more than the invoice cost as the best match receipt record for the invoice record.

4. The non-transitory computer-readable medium of claim 1, wherein the instructions to selectively utilize criteria comprise instructions configured to cause the computing device to select a single one of the at least two receipt records having a fewest number of item level variances with respect to the invoice record as the best match receipt record for the invoice record.

5. The non-transitory computer-readable medium of claim 1, wherein the instructions to selectively utilize criteria comprise instructions configured to cause the computing device to select a single one of the at least two receipt records having a receipt quantity that is closest to the invoice quantity as the best match receipt record for the invoice record.

6. The non-transitory computer-readable medium of claim 1, wherein the instructions to selectively utilize criteria comprise instructions configured to cause the computing device to:
select a single one of the at least two receipt records having a receipt cost that is closest to the invoice cost as the best match receipt record for the invoice;
in response to no single one of the at least two receipt records having a receipt cost that is closest to the invoice cost, select a single one of the at least two receipt records having a receipt cost that is more than the invoice cost as the best match receipt record for the invoice record when no more than one receipt record has a receipt cost that is more than the invoice cost;
in response to no single receipt record having i) a receipt cost that is closest to the invoice cost or ii) a receipt cost that is more than the invoice cost, select a single one of the at least two receipt records having a fewest number of item level variances with respect to the invoice record as the best match receipt record for the invoice record; and
in response to no single receipt record having i) a receipt cost that is closest to the invoice cost or ii) a receipt cost that is more than the invoice cost or iii) a fewest number of item level variances with respect to the invoice record, select a single one of the at least two receipt records having a receipt quantity that is closest to the invoice quantity as the best match receipt record for the invoice record.

7. The non-transitory computer-readable medium of claim 1, comprising instructions configured to cause the computing device to transmit invoice records that do not have a matching receipt to a computing system that supports manual resolution.

8. A computing system, comprising:
a processor connected to memory; and
a module stored on a non-transitory computer readable medium and configured with instructions that when executed by the processor cause the processor to:
receive a plurality of invoice records from an inventory database, where each invoice record stores data describing an invoice quantity of items and an invoice cost;
receive a plurality of receipt records from a receipt database, where each receipt record includes data describing a receipt quantity of items and a receipt cost;
match the plurality of invoice records to the plurality of receipt records such that a given invoice record is deemed to match a given receipt record when a first set of criteria are met;
for each invoice record that matches a single receipt record and no other receipt record, recording data in the invoice record indicating that the invoice record is matched to the receipt record; and
for each invoice record that matches at least two receipt records based on the first set of criteria, the computing device is cause to:
(i) use a second set of criteria to select one of the at least two receipt records as a best match receipt record for the invoice when at least one of the second set of criteria are met as between the invoice record and a single one of the at least two receipt records, wherein the second set of criteria is evaluated using a different technique from the first set of criteria and the different technique is subsequent in order of priority to a technique used to evaluate the first set of criteria; and
(ii) record data in the invoice record indicating that the invoice record is matched to the selected receipt record;

where the first set of criteria is different from the second set of criteria;

transmit, via a network communication to a remote system, the invoice records determined to have matching receipt records; and transmit, via the network communication to the remote system, a command to initiate payment of the invoice records by the remote system.

9. The computing system of claim 8, wherein the instructions to selectively utilize criteria comprise instructions that cause the processor to select a single one of the at least two receipt records having a receipt cost that is closest to the invoice cost as the best match receipt record for the invoice record.

10. The computing system of claim 8, wherein the instructions to selectively utilize criteria comprise instructions that cause the processor to select a single one of the at least two receipt records having a receipt cost that is more than the invoice cost as the best match receipt record for the invoice record.

11. The computing system of claim 8, wherein the instructions to selectively utilize criteria comprise instructions that cause the processor to select a single one of the at least two receipt records having a fewest number of item level variances with respect to the invoice record as the best match receipt record for the invoice record.

12. The computing system of claim 8, wherein the instructions to selectively utilize criteria comprise instructions that cause the processor to select a single one of the at least two receipt records having a receipt quantity that is closest to the invoice quantity as the best match receipt record for the invoice record.

13. The computing system of claim 8, wherein the instructions cause the processor to transmit invoice records that do not have a matching receipt to a computing system that supports manual resolution.

14. A computer-implemented method, comprising:
receiving, by a processor, a plurality of invoice records from an inventory database, where each invoice record stores data describing an invoice quantity of items and an invoice cost;
receiving, by the processor, a plurality of receipt records from a receipt database, where each receipt record includes data describing a receipt quantity of items and a receipt cost;
matching, by the processor, the plurality of invoice records to the plurality of receipt records such that a given invoice record is deemed to match a given receipt record when a first set of criteria are met;
for each invoice record that matches a single receipt record and no other receipt record, recording data in the invoice record indicating that the invoice record is matched to the receipt record;
for each invoice record that matches at least two receipt records based on the first set of criteria, the computing device is caused to:
(i) use a second set of criteria to select one of the at least two receipt records as a best match receipt record for the invoice when at least one of the second set of criteria are met as between the invoice record and a single one of the at least two receipt records, wherein the second set of criteria is evaluated using a different technique from the first set of criteria and the different technique is subsequent in order of priority to a technique used to evaluate the first set of criteria; and
(ii) record, by the processor, data in the invoice record indicating that the invoice record is matched to the selected receipt record;
where the first set of criteria is different from the second set of criteria;
transmitting, by the processor via a network communication to a remote system, the invoice records determined to have matching receipt records; and
transmit, by the processor via the network communication to the remote system, a command to initiate payment of the invoice records by the remote system.

15. The computer-implemented method of claim 14, wherein the selectively utilizing criteria comprises selecting a single one of the at least two receipt records having a receipt cost that is closest to the invoice cost as the best match receipt record for the invoice record.

16. The computer-implemented method of claim 14, wherein the selectively utilizing criteria comprises selecting a single one of the at least two receipt records having a receipt cost that is more than the invoice cost as the best match receipt record for the invoice record.

17. The computer-implemented method of claim 14, wherein the selectively utilizing criteria comprises selecting a single one of the at least two receipt records having a fewest number of item level variances with respect to the invoice record as the best match receipt record for the invoice record.

18. The computer-implemented method of claim 14, wherein the selectively utilizing criteria comprises selecting a single one of the at least two receipt records having a receipt quantity that is closest to the invoice quantity as the best match receipt record for the invoice record.

19. The computer-implemented method of claim 14, wherein the selectively utilizing criteria comprises:
selecting a single one of the at least two receipt records having a receipt cost that is closest to the invoice cost as the best match receipt record for the invoice;
in response to no single one of the at least two receipt records having a receipt cost that is closest to the invoice cost, selecting a single one of the at least two receipt records having a receipt cost that is more than the invoice cost as the best match receipt record for the invoice record when no more than one receipt record has a receipt cost that is more than the invoice cost;
in response to no single receipt record having i) a receipt cost that is closest to the invoice cost or ii) a receipt cost that is more than the invoice cost, select a single one of the at least two receipt records having a fewest number of item level variances with respect to the invoice record as the best match receipt record for the invoice record; and
in response to no single receipt record having i) a receipt cost that is closest to the invoice cost or ii) a receipt cost that is more than the invoice cost or iii) a fewest number of item level variances with respect to the invoice record, select a single one of the at least two receipt records having a receipt quantity that is closest to the invoice quantity as the best match receipt record for the invoice record.

20. The computer-implemented method of claim 14, comprising transmitting invoice records that do not have a matching receipt to a computing system that supports manual resolution.

* * * * *